United States Patent [19]

Negishi et al.

[11] Patent Number: 4,811,088
[45] Date of Patent: Mar. 7, 1989

[54] COLOR VIDEO CAMERA APPARATUS PROVIDING CORRECTION OF LIGHT INTENSITY-DEPENDENT PHASE ERRORS IN COLOR MULTIPLEX CARRIER SIGNAL

[75] Inventors: Ichiro Negishi, Tokyo; Shintaro Nakagaki, Fujisawa; Hiroshi Ichimura, Tokyo, all of Japan

[73] Assignee: Victor Company of Japan, Ltd., Yokohama, Japan

[21] Appl. No.: 72,495

[22] Filed: Jul. 13, 1987

[30] Foreign Application Priority Data

Jul. 11, 1986 [JP] Japan ................................. 61-162970

[51] Int. Cl.⁴ ........................ H04N 9/083; H04N 9/07
[52] U.S. Cl. ......................................... 358/47; 358/44
[58] Field of Search ..................... 358/41, 43, 44, 47

[56] References Cited

U.S. PATENT DOCUMENTS

| | | | |
|---|---|---|---|
| 4,620,221 | 10/1986 | Takanashi et al. | 358/47 |
| 4,630,107 | 12/1986 | Takanashi et al. | 358/44 |
| 4,652,910 | 3/1987 | Nakagaki et al. | 358/44 |
| 4,691,227 | 9/1987 | Takanashi et al. | 358/47 |
| 4,736,242 | 4/1988 | Takanashi et al. | 358/44 |
| 4,736,243 | 4/1988 | Takanashi et al. | 358/47 |

FOREIGN PATENT DOCUMENTS

| | | | |
|---|---|---|---|
| 53-78727 | 7/1978 | Japan | 358/44 |
| 56-164691 | 12/1981 | Japan | 358/44 |
| 59-153392 | 9/1984 | Japan | |
| 60-90486 | 5/1985 | Japan | 358/44 |
| 61-88685 | 5/1986 | Japan | |

*Primary Examiner*—James J. Groody
*Assistant Examiner*—Randall S. Svihla
*Attorney, Agent, or Firm*—Pollock, VandeSande & Priddy

[57] ABSTRACT

A single tube color video camera apparatus having a camera tube including a color separation stripe filter and producing an output signal containing a color multiplex carrier signal, utilizes an envelope detector for directly detecting the camera tube output signal to produce an envelope detection signal which varies in accordance with an electrical charge pattern of the tube target. Phase control of the color multiplex carrier signal extracted from the camera tube output signal is executed based upon the envelope detection signal, to thereby correct for color signal phase deviations caused by variations in light intensity of scenes viewed by the camera.

8 Claims, 5 Drawing Sheets

COLOR VIDEO CAMERA APPARATUS PROVIDING CORRECTION OF LIGHT INTENSITY-DEPENDENT PHASE ERRORS IN COLOR MULTIPLEX CARRIER SIGNAL

BACKGROUND OF THE INVENTION

The present invention relates to a single-tube color video camera apparatus having a color separation stripe filter which is positioned in the light path of a photoelectric conversion section of a camera tube, and more particularly to an improvement of such a camera apparatus whereby phase errors of a color signal resulting from variations in viewed light intensity can be substantially reduced.

The present application is related to the copending commonly assigned application Ser. No. 784,867, filed Oct. 4, 1985 now U.S. Pat. No. 4,736,242.

The single-tube type of color video camera, utilizing a stripe filter for color separation, is now in widespread use. With such a camera, light from a scene being viewed by the camera is passed through the stripe filter to a photoconductive layer of a photelectric conversion section, which is raster-scanned by an electron beam. As the electron beam passes across each portion of the photoconductive layer corresponding to a specific color of filter stripe, i.e. illuminated by light transmitted through that stripe, the charge which has become stored on that photoconductive layer portion as a result of incident light is discharged, whereby a current flow occurs. The level of this current represents the light intensity of the corresponding portion of the viewed scene, while the timing at which the current flow occurs (i.e. during a horizontal scanning interval) indicates the color of light represented by this current. An output current signal is thereby produced from the camera picture tube which includes a color multiplex carrier signal component.

Ideally, the respective timings at which discharge current flows begin, for portions of the photoconductive layer corresponding to different color stripes, should be independent of the intensity of light which is viewed by the camera. However with a prior art single-tube color video camera this is not the case. Specifically, if the beam current of the scanning electron beam is fixed, then the time required to discharge a portion of the photoconductive layer (i.e. lying below a specific stripe of the filter) that is illuminated with relatively high intensity of light will be significantly longer than the time required to discharge a portion illuminated by light of low intensity. As a result, the phase of the color multiplex carrier signal produced by the camera will vary in accordance with variations in the level of light which is transferred through the color stripes. Since the operation of such a camera apparatus is based upon the assumption of a fixed relationship between successive electron beam scanning positions and the timings of color carrier signal portions corresponding to respective color stripes, such phase deviations make it impossible to obtain an accurate color video signal under conditions of varying light intensity in the scenes viewed by the camera.

SUMMARY OF THE INVENTION

It is an objective of the present invention to overcome the problem described above, by providing a single-tube color video camera apparatus whereby light intensity-dependent phase errors in a color multiplex carrier component of a video signal produced from the apparatus can be reduced, by comparison with the prior art.

To attain the above objective, the present invention provides a single-tube color video camera apparatus including a video camera which produces an output signal containing a color multiplex carrier signal, means for performing envelope detection of the camera tube output signal to produce an envelope detection signal and means controlled by the envelope detection signal for executing phase control of the color multiplex carrier signal to compensate for phase deviations dependent upon variations in light intensity of scenes viewed by the camera.

The phase control means can comprise a variable delay circuit which applies an amount of delay to the color multiplex carrier that is determined in accordance with the envelope detection signal. Alternatively, the phase control means can be based upon control of the deflection speed of the electron beam in the camera tube, in accordance with the envelope detection signal.

DETAILED DESCRIPTION OF THE INVENTION

Figure 1:
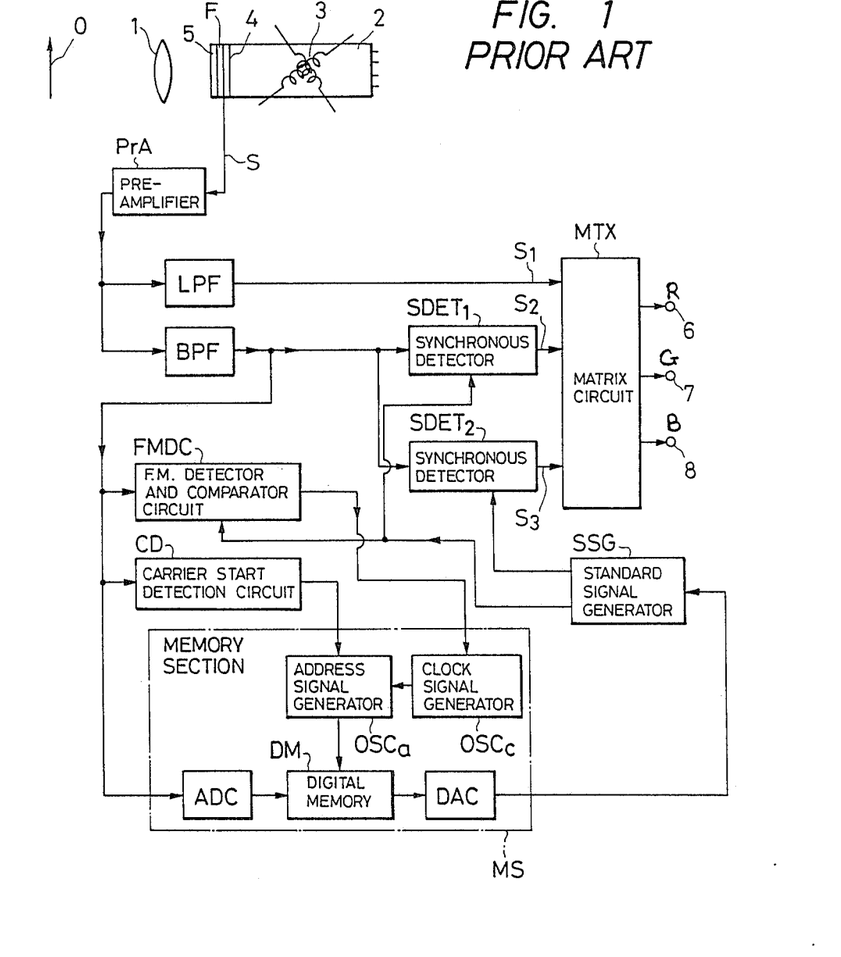
FIG. 1 is a block system diagram of an example of a color video camera apparatus which has been previously proposed by the assignee of the present invention.

Before describing embodiments of the present invention, a prior art example of a color video camera apparatus will be described referring to FIG. 1, which has been disclosed by the assignee of the present invention in Japanese Patent Application No. 58-28332, with application date Feb. 22, 1983, published as Japanese Kokai 59-153392. In FIG. 1, O denotes an object which is to be imaged by the camera apparatus, numeral 1 denotes an object lens, numeral 2 denotes a camera tube, 4 denotes a photo-electric conversion section of camera tube 2, i.e. a target having a layer of photoconductive layer functioning as a photo-electric conversion surface , numeral 3 denotes a deflection yoke whereby electron beam scanning of the photo-electric conversion section 4 is controlled, and F denotes a color separation stripe filter which is disposed in a light path through which light from object O is passed to the photo-electric conversion section 4. The filter F contains an array of color stripes, consisting of successive repetitions of a specific pattern of stripes of respectively different color. Numeral 5 denotes the front surface of camera tube 2. PrA denotes a preamplifier which is coupled to receive and amplify a camera tube output signal S from camera tube 2, BPF is a bandpass filter and LPF a low-pass filter. SSG denotes a standard signal generator, while SDET1 and SDET2 are respective synchronous detectors. MTX denotes a matrix circuit, while 6, 7 and 8 denote R, G and B color signal output terminals respectively. MS denotes a memory section.

Figure 2:
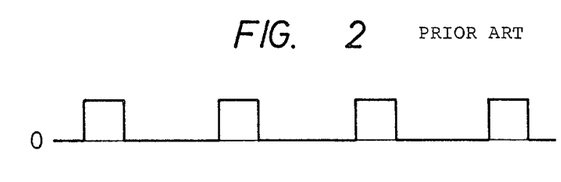
FIG. 2 is a waveform diagram of an example of a camera tube output signal produced when light of a specific color separation filter strip color is viewed by the camera.
Figure 3A:
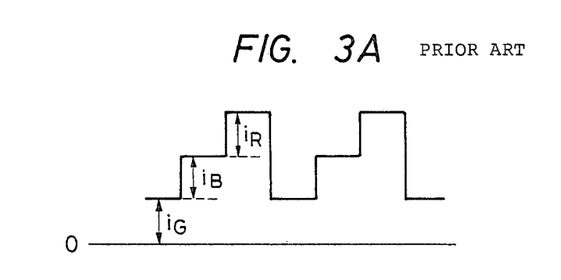
FIGS. 3A and 3B are waveform diagrams of examples of a camera tube output signal resulting from imaging of white light and green light respectively.
Figure 3B:
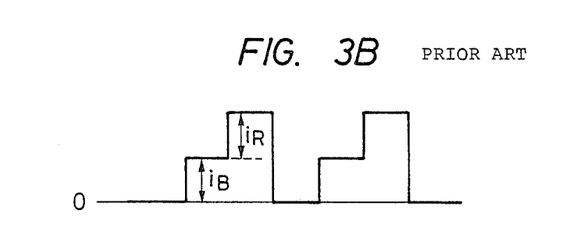

The operation of this apparatus is as follows. Light from object O is transferred through object lens 1 and the color separation stripe filter F to the photo-electric conversion section 4 of camera tube 2. The output signal S which is thereby produced from camera tube 2 contains a color multiplex carrier component and a luminance component. The color multiplex carrier component has a repetition frequency determined by the speed of electron beam deflection during scanning of the photo-electric conversion section 4 and the color stripe pattern of filter F, and is phase and amplitude modulated in accordance with color information obtained by the scanning process. This can be understood from the waveform diagrams of FIGS. 2 and 3A, 3B. If only light of a color corresponding to one of the strip colors of the color separation filter F is directed into the camera, then during each horizontal scan across the photo-electric conversion section 4 a pulse of signal S will be produced each time a portion of the photo-electric conversion surface corresponding to a filter stripe of that specific color is scanned by the electron beam of the camera tube 2, i.e. with each pulse of signal S being produced as the electron beam discharges the charge which has been built up on a portion of the photoconductive layer below one of these filter stripes. In this case, the camera tube output signal S will have the form shown (in idealized form) in FIG. 2, in which the phase of the pulses constituting the signal is determined by the positions of the aforementioned filter strips of the specific color, and hence by the color of light which is being viewed by the camera. FIG. 3A shows the output signal from the camera tube for the case in which white light is being imaged by the camera, while FIG. 3B shows the camera tube output signal when magenta (i.e. −G) light is being imaged. In FIGS. 3A and 3B, $i_r$, $i_b$ and $i_g$ denote amplitudes of camera tube output signal current produced by scanning portions of the photo-electric conversion surface corresponding to respective successively adjacent strips of the color conversion section 4. It can thus be understood that the camera tube output signal contains a color multiplex carrier component which is modulated in phase and amplitude such as to convey all of the color information contained in that output signal. After being amplified in preamplifier PrA, the camera tube output signal S is supplied to the low-pass filter LPF and bandpass filter BPF. The low-pass filter LPF separates the DC component, i.e. the luminance component of signal S, and produces this as signal $S_1$, which is supplied to the matrix circuit MTX. The fundamental components of the color multiplex carrier are obtained by transferring the camera tube output signal S through a bandpass filter BPF. These fundamental carrier components are then demodulated by synchronous detection performed by synchronous detectors SDET1 and SDET2, to thereby produce demodulated color signals $S_2$ and $S_3$, which are supplied to the matrix circuit MTX. The matrix circuit MTX processes signals $S_1$, $S_2$ and $S_3$ to produce R, G and B color signals for transmission to an external apparatus, on output terminals 6, 7 and 8 respectively.

In the following, the color multiple carrier signal produced from the output of bandpass filter BPF will be referred to simply as the color carrier signal, for simplicity of description.

In addition to being supplied to the synchronous detectors SDET1 and SDET2, the color carrier signal which is produced from the bandpass filter BPF is also supplied to the memory section MS, to an FM (frequency modulation) detector and comparator circuit FMDC, and to a carrier start position detection circuit CD.

Prior to the start of actual imaging operation by the video camera apparatus, a data signal corresponding to at least one frame of the output signal from the camera tube 2 is stored in memory section MS. This data signal is obtained from the color carrier signal produced by bandpass filter BPF under a condition in which light is directed into camera tube 2 which is of a specific arbitrarily determined color corresponding to one of the colors of the color stripes in the color separation filter F. Thus, the camera tube output signal during this data storage operation will be of the form shown in FIG. 2. The color video camera apparatus is operated such that when actual imaging operation by the apparatus commences, the data signal which has thus been stored in memory section MS is repetitively read out to produce an output data signal which extends continuously along the time axis.

The memory elements used to configure the memory apparatus MS may be of various types, e.g digital memory elements or analog memory elements. It is also possible to employ semiconductor memory devices as the memory elements, or to employ a magnetic disc, buffer memory, storage tube, etc. for this purpose.

It is also equally possible to use either volatile or non-volatile memory elements to configure the memory elements of section MS. If non-volatile memory elements are used, then it will be possible to execute storage of the data signal permanently in memory section MS at the stage of manufacture of the color video camera apparatus.

As stated above, the data signal which is stored in memory section MS corresponds to at least one frame (or field) interval of the camera tube output signal, obtained by imaging a specific arbitrarily determined color corresponding to the color of a color stripe in filter F. It is possible to obtain this data signal by any of the following methods:

(a) Directly utilizing the fundamental carrier component of the camera tube output signal, i.e. the color carrier signal from bandpass filter BPF.

(b) Performing frequency division (i.e. counting down) of the fundamental carrier component to obtain the data signal.

(c) Utilizing a frequency converter to perform heterodyne down-conversion of the fundamental carrier component to thereby obtain the data signal.

Use of either method (b) or method (c) above has the advantage that the number of memory elements required for memory section MS (i.e. the memory capacity required) is reduced by comparison with the use of method (a). Furthermore, if method (c) is used, then in addition to the latter advantage, the further advantage is gained that phase errors produced at the stage of memory read-out can be reduced.

The data signal which is thus memorized in the memory elements of memory section MS can consist of a signal which extends continuously over one frame interval, or a signal which extends continuously over one field interval of the camera tube output signal. Alternatively, the data signal can consist of intermittent portions of one frame (or field) interval, for example the color carrier signal produced during one out of every 5 successive horizontal scanning intervals.

However, whatever the form of signal which is used as the data signal to be memorized in the memory elements of memory section MS (i.e. irrespective of whether this is a continuous or an intermittent form of signal), the data signal which is produced as output from memory section MS must be made to extend continuously along the time axis. That is to say, irrespective of whether the data signal which is supplied to memory section MS to be stored therein is a signal which extends continuously over at least one frame interval of the camera tube output signal or consists of portions which occur intermittently during one frame interval, this signal must be such as to enable a continuous form of data signal to be subsequently read out from memory section MS.

As stated above, the memory elements which are used to constitute the memory section MS can be of digital or of analog type. However in the example of a color video camera apparatus shown in FIG. 1 and described herein, digital memory elements are employed, which constitute a digital memory DM within memory apparatus MS. The memory section MS also includes an analog-digital converter ADC, a digital-analog converter DAC and an address signal generator $OSC_a$ and a clock signal generator $OSC_c$. The address signal generator $OSC_a$ determines successive addresses in digital memory DM in which data are stored or from which data are read out.

The carrier start position detection circuit CD functions to produce signals which correspond to the points in time at which the color carrier signal begins to appear in the camera tube output signal (i.e. after each blanking interval). Circuit CD can consist for example of a programmable monostable multivibrator and a differentiator circuit.

The FM detector and comparator circuit FMDC functions to produce an output signal which indicates the polarity and magnitude of the frequency difference between two signals, and can consist for example of a pair of frequency discriminator circuits and a comparator for comparing the output signals from these frequency discriminator circuits.

Based on the continuously generated data signal which is produced from memory section MS as described above, the standard signal generator SSG produces a pair of continuously generated standard signals having respective predetermined phases as required for demodulation of the color carrier signal from bandpass filter BPF by the synchronous detectors SDET1 and SDET2 to obtain respective color signals $S_2$ and $S_3$, and supplies these respective standard signals to SDET1 and SDET2. The standard signal generator SSG can consist for example of a synchronous oscillator based on a phase locked loop, and a phase shifter.

With the color video camera apparatus shown in FIG. 1 and described above, which has been previously proposed by the assignee of the present invention, it is necessary to store a data signal corresponding to at least one frame interval of the fundamental carrier component of the camera tube output signal, i.e. the color carrier signal produced from bandpass filter BPF, this data signal being produced while the camera tube is imaging a specific color of light, corresponding to an arbitrarily determined one of the colors of the color stripes of the color separation filter. Storage of this data signal must be executed prior to the commencement of normal camera imaging operation by the apparatus. With such a color video camera apparatus, it is necessary to manually actuate a specific operating switch in an operating section (not shown in the drawings) of the apparatus in order to produce and store this data signal. The apparatus is configured such as to be responsive to actuation of this switch for illuminating the camera tube with light of the specific color mentioned above, whereby the fundamental component of the color carrier (i.e. the color carrier produced from bandpass filter BPF as described above) will have a predetermined phase as determined by the aforementioned specific color. During this condition, the memory section MS is set in a storage mode of operation, whereby the color carrier signal (or selected portions of that color carrier signal) produced from bandpass filter BPF becomes stored in successive memory locations of digital memory DM of memory section MS as the data signal described hereinabove. This storage is accomplished by first performing conversion of the output signal from bandpass filter BPF to digital form, by analog-digital converter ADC, with this conversion being performed on the basis of sampling pulses produced from a sampling pulse source (not shown in the drawings). The resultant digital signals are stored sequentially in digital memory DM, in accordance with address signals produced by address signal generator $OSC_a$. The address signal generator $OSC_a$ performs address selection operations at timings determined by a clock signal which is produced by the clock signal generator $OSC_c$.

When data corresponding to one frame interval of the fundamental carrier component of the camera tube output signal have been stored in digital memory DM, with memory section MS in the storage mode of operation described above, MS is changed to a read-out mode of operation in order to commence normal imaging operation of the video camera apparatus. The digital data which has been stored in memory section MS is then repetitively read out therefrom, and is converted to analog signal form by the digital-analog converter DAC. An analog signal which extends continuously along the time axis, referred to herein as the output data signal, is thereby produced from memory section MS and is supplied to the standard signal generator SSG, which thereby produces two standard signals for color signal demodulation, by synchronous detection, i.e. standard signals each of appropriate phase and frequency for demodulating the color carrier signal by synchronous detection, and generated on the basis of the analog output signal from digital-analog converter DAC. These standard signals are supplied to the synchronous detectors SDET1 and SDET2 to control synchronous detection of the color carrier.

If the electron beam scanning of camera tube 2 were always completely uniform, then it would be possible to execute satisfactory demodulation of the color carrier signal by directly utilizing standard signals produced on the basis of the output data signal read out from memory section MS as described hereinabove. However in practice, the deflection circuits and deflection yoke of a color video camera are not completely stable, and as a result some variations occur in the electron beam scanning operation. In addition, scanning can be affected by factors such as extraneous magnetic fields. For these reasons, it cannot be guaranteed that satisfactory color signals will always be obtained by performing demodulation (i.e. by synchronous detection) directly utilizing the standard signals produced on the basis of the output data signal from memory section MS as described above, since precise respective phase relationships between these standard signals and the color carrier signal cannot be guaranteed. With the color video camera apparatus which has been previously proposed by the assignee of the present invention, therefore, either the color carrier signal obtained from the camera tube output signal or the output data signal read out from memory section MS is utilized as a reference signal, while the other signal is controlled such that time axis deviations of that signal are made identical to those of the reference signal. By using the color carrier signal of the output signal from the camera tube as this reference signal, as is done in the example of FIG. 1 by means of the FM detector and comparator circuit FMDC controlling clock signal generator $OSC_c$, time axis deviations of the output data signal produced from memory section MS are made to follow the time axis deviations of the camera tube output signal. However it would be equally possible to utilize the output data signal which is read out from memory section MS as the reference signal.

Referring to FIG. 1, when the color video camera apparatus is set in the normal imaging mode of operation, with memory section MS set in the data signal read out mode, the output signal from bandpass filter BPF is supplied to synchronous detectors SDET1 and SDET2, to the carrier start position detection circuit CD, and to the FM detector and comparator circuit FMDC, while the output data signal from memory apparatus MS is converted to an analog signal by digital-analog converter DAC which is supplied to the standard signal generator SSG. SSG thereby produces standard signals, based upon this analog signal from memory section MS, which are respectively supplied to synchronous detectors SDET1 and SDET2, while in addition one of these standard signals from the SSG is also supplied to the FM detector and comparator circuit FMDC. The FM detector and comparator circuit FMDC produces an output signal in accordance with the frequency difference between the latter standard signal and the output signal produced from bandpass filter BPF, and this output signal is supplied to the clock signal generator $OSC_c$ of the memory section MS. In this way, the period of the clock signal pulses produced from $OSC_c$ is controlled in a manner such as to reduce the frequency difference between the output signal from bandpass filter BPF and the aforementioned one of the standard signals from standard signal generator SSG, (and hence of course the output data signal from memory section MS) towards zero. The carrier start position detection circuit CD, which receives the output signal from bandpass filter BPF, produces an output pulse at each point in time at which a beam blanking interval is terminated and the color multiplex carrier component again appears in the camera tube output signal. These output pulses from CD are applied to the address signal generator $OSC_a$, to execute reset of $OSC_a$.

With the color video camera apparatus previously disclosed by the assignee of the present invention, shown in FIG. 1 and described hereinabove, correct centering is accomplished as a result of resetting the address signal generator $OSC_a$ in memory section MS by output pulses from the carrier start position detection circuit CD. In addition, as a result of the control of the frequency of the clock signal produced from clock signal generator $OSC_c$ by the output signal from FM detector and comparator circuit FMDC, the standard signals which are supplied by standard signal generator SSG to the synchronous detectors SDET1 and SDET2 respectively will exhibit the same time axis deviations as those which are exhibited by the output signal from bandpass filter BPF. This serves to ensure that correct color signals will be produced by the synchronous detectors SDET1 and SDET2, irrespective of the effects of component drift or external magnetic fields upon the scanning operation of the camera tube 2.

Thus with the color video camera apparatus described above, previously proposed by the assignee of the present invention, an output signal produced from a camera tube, containing a color carrier signal component which has been phase modulated and amplitude modulated in accordance with a plurality of types of color data, is divided into a DC (i.e. luminance) component and a color carrier signal. The color carrier signal is subjected to phase detection, utilizing standard signals (i.e. reference signals) having predetermined respective phases, to produce demodulated color signals. In order to correctly establish the respective phases of these standard signals which are utilized in the demodulation process, the standard signals are generated from an output data signal (read out from memory section MS) having a specific phase. Prior to the start of normal imaging operation by the apparatus, light of a color which is identical to the color of one specific type of color stripe of the color separation stripe filter of the camera apparatus is directed onto the camera tube, whereby an output signal corresponding to that color of light is produced from the camera tube. The fundamental component of the color carrier contained in this camera tube output signal, i.e. the color carrier signal (whose phase is determined by the color of light directed into the camera tube) is then stored in a memory section. Subsequently, when normal imaging operation by the camera apparatus is executed, the data which was stored in the memory section is repetitively read out to produce a continuous output data signal, and standard signals having respective predetermined phases are generated for demodulation of the color carrier signal from the camera tube output signal, with the phases of these standard signals being determined by the stored signal which is read out from the memory section. In addition, means are provided whereby one of two signals (i.e. the color carrier signal obtained from the camera tube output signal and the output data signal from the memory section) is utilized as a reference signal, and whereby time-axis deviations of the other one of these two signals are made to correspond to the time-axis deviations of the reference signal.

Figure 4A:
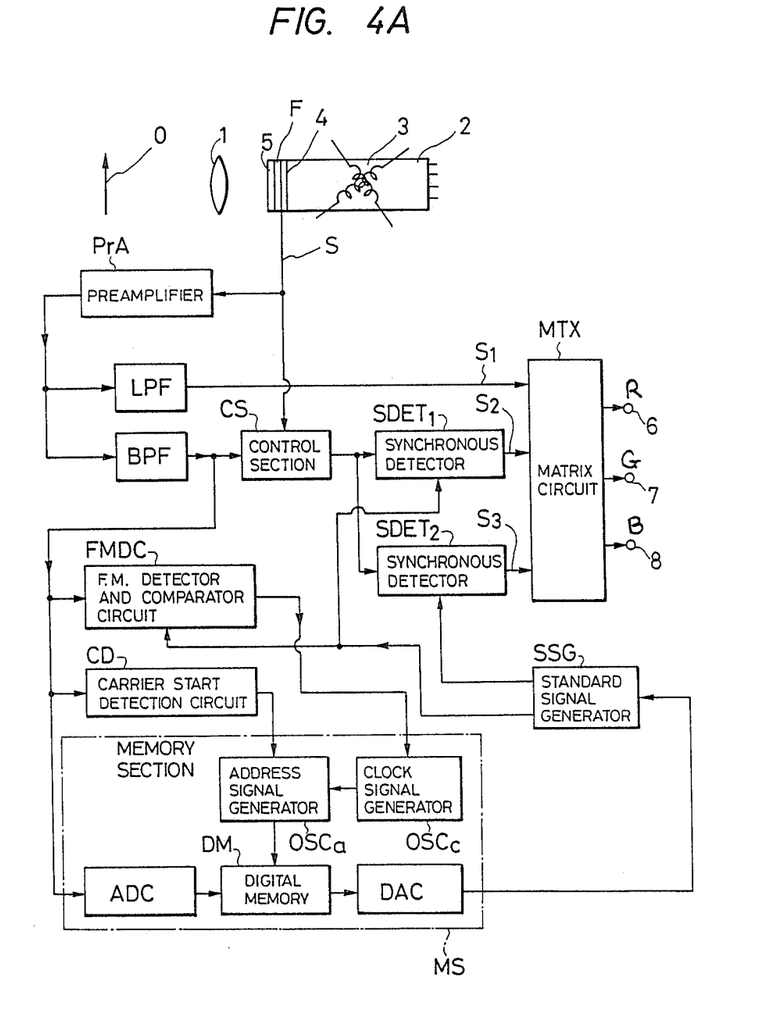
FIG. 4A is a block system diagram of a first embodiment of a color video camera apparatus according to the present invention.

However, in spite of the measures described above which are employed in this prior art color video camera apparatus, there remains a requirement for more precise phase control of the color multiplex carrier component of the camera tube output signal, in order to reduce phase errors in the color signals produced as outputs from the apparatus and thereby attain improved display image quality. As stated hereinabove, such phase errors result from the fact that when the scanning electron beam moves across a portion of the photoconductive layer of the camera tube situated below one of the color separation filter stripes, the time taken to discharge that portion of the photoconductive layer will vary in accordance with the level of light which is passed through that filter stripe. Embodiments of the present invention will first be described whereby this problem is overcome by subjecting the color carrier signal to a variable amount of delay, which is controlled in accordance with the intensity of light being viewed by the camera, to thereby correct the phase errors of that color carrier which are dependent on light intensity as described above. Referring first to FIG. 4A, a block circuit diagram is shown of a first embodiment of a color video camera apparatus according to the present invention. The portions of this embodiment which are identical to the prior art example shown in FIG. 1 and described hereinabove are designated as in FIG. 1, and further description will be omitted. The improvement provided by the present invention essentially consists in a control section CS, which is coupled to receive the color carrier signal from the band-pass filter BPF, and which applies a variable amount of time delay to that color carrer signal, in accordance with the amplitude of the envelope of the camera tube output signal S. The delayed color carrier signal which is thereby produced from control section CS is supplied to the synchronous detectors SDET1 and SDET2.

Figure 4B:
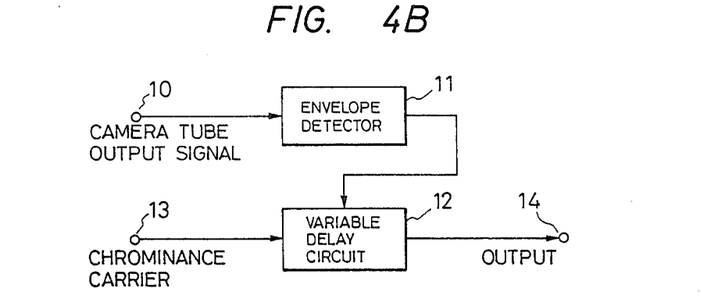
FIG. 4B is a block circuit diagram of a control section of the embodiment of FIG. 4A.

FIG. 4B is a block diagram showing the internal configuration of control section CS of this embodiment. Numeral 10 denotes a first input terminal which is coupled to receive the camera tube output signal S from preamplifier PrA. Envelope detection of this signal is performed by envelope detection circuit 11, and the resultant envelope detection signal is supplied as a control signal to a variable delay circuit 12. A second input terminal 13 is coupled to receive the color carrier signal supplied from the output of bandpass filter BPF in FIG. 1, and subjects this signal to delay by a delay time which is varied in accordance with the level of the control signal applied from envelope detection circuit 11. Phase errors in the color carrier resulting from variations in the intensity of light in scenes viewed by the camera tube are thereby effectively corrected. The delayed color carrier signal which is thereby produced from variable delay circuit 12 is supplied to an output terminal 14, and from there to the synchronous detectors SDET1 and SDET2 shown in FIG. 1. It should be noted that it would be equally possible to apply variable time delay to the data signal which is read out from memory section MS in FIG. 1, by the variable delay circuit 12, in accordance with the control signal produced from envelope detection circuit 11, with an identical effect of reducing phase control errors of the color carrier being obtained.

By applying the circuit shown in FIG. 4B to a color video camera apparatus, even if deviations in the modulation degree produced by electron beam scanning should occur due to differences in the colors of objects which are imaged by the camera apparatus, resultant phase errors can be significantly reduced, since the delay time which is produced by variable delay circuit 12 is determined by a control signal derived by envelope detection of the output signal from the camera tube.

It should be noted that it is not possible to attain a comparable effectiveness of phase error correction by utilizing the average value of the camera tube output signal as a control signal to control a variable amount of delay applied to the chrominance carrier. This point can be understood by referring again to FIGS. 3A and 3B in which as described above FIG. 3A shows the output signal from the camera tube for the case in which a white object is being imaged by the camera, while FIG. 3B shows the camera tube output signal when a magenta (i.e. a $-G$) object is being imaged. It will be apparent that more accurate control will be attained by executing envelope detection of the camera tube output signal than is possible by using an average value of that output signal, since the envelope detection signal can respond much more rapidly to changes in amplitude of the color tube output signal.

Alternatively stated, by executing envelope detection of the camera tube output signal and using the resultant detection signal as a control signal, it is ensured that this control signal will always vary in correspondence with the charge pattern of the photoelectric conversion section of the camera tube.

By correcting the phase errors in the color carrier obtained from the camera tube output signal in this way, utilizing a control signal obtained by envelope detection of the camera tube output signal, demodulated color signals can be obtained which are substantially free from color errors, whereby the picture quality of a displayed image provided by the camera apparatus can be appreciably improved.

Figure 5:
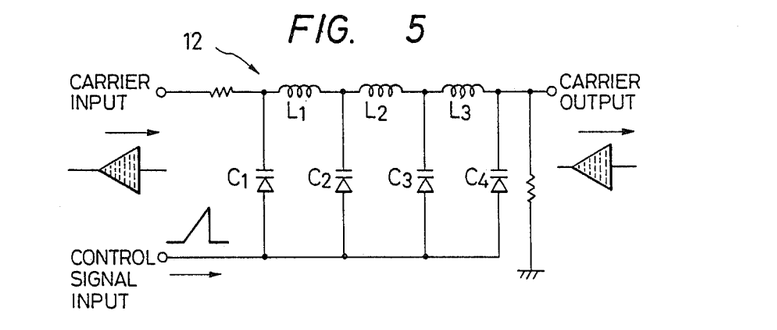
FIG. 5 is a circuit diagram of an example of a variable delay circuit for use in the control section of the embodiment of FIG. 4A.

FIG. 5 shows a specific example of a suitable circuit for the variable delay circuit 12 of the embodiment of FIG. 4B. As shown, in addition to input and output termination resistors, the circuit consists of a set of series-connected inductors, designated as $L_1$, $L_2$ and $L_3$, periodically coupled to successive varactor diodes (i.e. voltage-controlled variable-capacitance diodes), designated as $C_1$, $C_2$, $C_3$ and $C_4$, with one electrode of each of the variable capacitance diodes being coupled to receive the control signal produced from envelope detection circuit 11 as described above. If it is assumed that the envelope of the output signal from the camera tube has a triangular shape, as indicated in FIG. 5, then the control signal from envelope detection circuit 11 will be of sawtooth form as shown. There is a non-linear relationship between the delay time produced by each L-C section of the filter, which will be designated as $t_d$, and the amplitude of the control signal, which will be designated as as v.

The capacitance C of a variable-capacitance diode is given as:

$$C = C_o/\sqrt{(1 - 2v)} \quad (1)$$

where $C_o$ is the capacitance value with zero voltage applied to the diode.

The value of delay time $t_d$ is given as:

$$t_d = \sqrt{2LC} \quad (2)$$

Thus, combining equations (1) and (2), $$t_d = (2 L C_0)^{\frac{1}{2}}/(1-2v)^{\frac{1}{2}}$$

Figure 6:
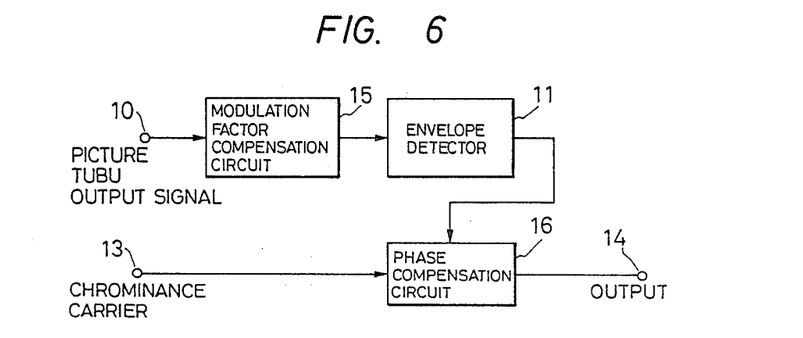
FIG. 6 is a block circuit diagram of a control section for a second embodiment of the present invention.

FIG. 6 is a block system diagram showing the essential components of a control section for a second embodiment of a color video camera apparatus according to the present invention. As for the embodiment of FIG. 4A, the remaining components of this embodiment are as shown in the prior art example of FIG. 1. In the embodiment of FIG. 6, the camera tube output signal (i.e. from the output of preamplifier PrA shown in FIG. 1) is applied to a first input terminal 10, and supplied to a modulation factor compensation circuit 15 to be subjected to modulation factor compensation (i.e. frequency response compensation), to compensate for a reduction in the modulation factor of the camera tube which occurs at high frequencies. This circuit 15 may be implemented by an equalizer. The resultant compensated output signal from modulation factor compensation circuit 15 is then supplied to an envelope detection circuit 11, to produce an envelope detection output signal. This signal is supplied as a control signal to phase compensation circuit 16. The color carrier signal from the output of bandpass filter BPF shown in FIG. 1 is supplied to input terminal 13, and hence to phase compensation circuit 16, to be subjected to phase compensation therein, with the degree of compensation being determined by the control signal supplied from envelope detection circuit 11. Phase control errors in the color carrier are thereby reduced, and the resultant phase-compensated color carrier from the output of phase compensation circuit 16 is supplied to output terminal 14, and hence to each of the synchronous detectors SDET1 and SDET2 shown in FIG. 1, as for the first embodiment described above.

Figure 7:
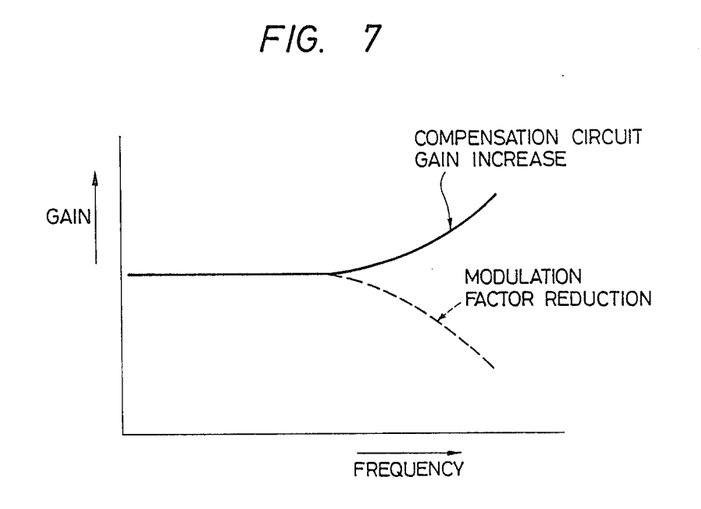
FIG. 7 is a diagram illustrating the frequency characteristic of a camera tube output signal and the gain characteristic of a modulation factor compensation circuit used in the embodiment of FIG. 6.

The reason for performing compensation by modulation factor compensation circuit 15 of this embodiment are as follows. Taking as an example the case of a prior art color video camera apparatus which has been disclosed by the assignee of the present invention (in Japanese patent application No. 59-210254, application date Oct. 6, 1984, published as Japanese Kokai 61-898685), a method of compensation for phase distortion in accordance with the level of a luminance signal is described therein. However, the camera tube output signal varies in accordance with the modulation factor of the camera tube, and the level of the camera tube output signal at certain frequencies is found in practice to be lower than the correct level (i.e. lower than a level which correctly corresponds to the actual electrical charge pattern on the photo-electric conversion section of the camera tube), so that use of the unmodified camera tube output signal to execute phase compensation (e.g. by performing envelope detection of that signal to obtain a control signal for use in performing phase compensation) will in fact not provide satisfactory compensation, and residual phase errors will occur in the demodulated color signals produced by such a method. This point is illustrated in the graphs of FIG. 7, in which the broken-line curve indicates the manner in which the level of the camera tube output signal falls off at high frequencies, as a result of a reduction of the effective modulation factor at high frequencies. For this reason, with the embodiment of the present invention shown in FIG. 6, compensation of the signal level of the camera tube output signal is applied by means of the modulation factor compensation circuit 15, which exhibits a gain/frequency characteristic of the form shown by the full-line curve in FIG. 7. In this way the level of the color carrier signal which is produced from the output of modulation factor compensation circuit 15 is compensated such as to correctly represent the charge pattern on the photo-electric conversion section of the camera tube. Substantially improved accuracy of phase compensation by phase compensation circuit 16 in response to the control signal from envelope detection circuit 11 is thereby attained.

Figure 8:
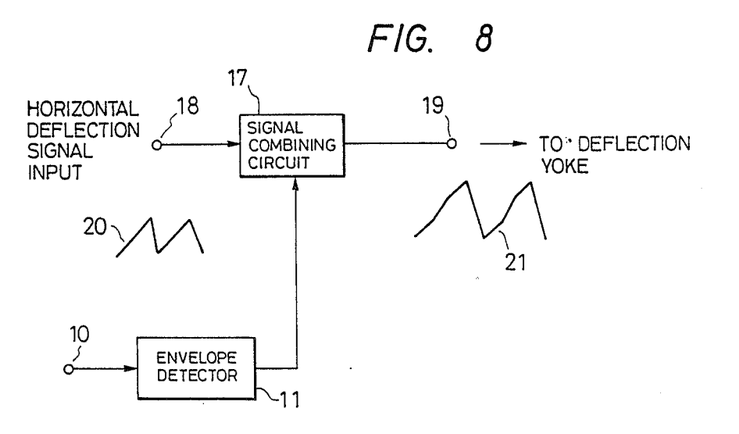
FIG. 8 is a diagram to illustrate a third embodiment of the invention, whereby phase compensation of a color multiplex carrier is executed by modifying the horizontal scanning speed of electron beam scanning in a camera tube.

With the first and second embodiments of the invention described above, a control signal produced by envelope detection of the camera tube output signal is used to control a variable amount of time delay which is applied to the color carrier signal that is derived from that camera tube output signal, for thereby correcting phase errors in the color carrier signal resulting from differing levels of viewed image light intensity. A third embodiment of the invention will now be described in which such a control signal obtained by envelope detection of the camera tube output signal is applied to modify the scanning speed of the scanning electron beam of the camera tube, to thereby correct the phase errors in the color carrier signal described above. This third embodiment is illustrated in FIG. 8. A horizontal deflection signal, of sawtooth waveform as indicated by numeral 20, is applied from an input terminal 18 to an input of a signal combining circuit 17. The camera tube output signal (S in FIG. 1) is applied from an input terminal 10 to an envelope detector circuit 11, and the resultant envelope detection signal is applied to a second input of the signal combining circuit 17. The resultant output signal from signal combining circuit 17 (indicated by numeral 21) is supplied to the horizontal scanning drive circuits of the deflection yokes 3 of the camera tube 2 (or of the deflection electrodes, in the case of a voltage deflection camera tube), to thereby modify the scanning speed of the electron beam in accordance with the amplitude of the envelope detection signal from circuit 11, and hence in accordance with levels of light in a scene which is being viewed by the camera. Phase correction of the chrominance carrier signal (from bandpass filter BPF in FIG. 1) can thereby be achieved, to eliminate the phase errors resulting from differences in light intensity which have been described hereinabove.

With a color video camera apparatus according to the present invention as described hereinabove, phase errors of a color carrier derived from a camera tube output signal, resulting from varying intensities of scene brightness being viewed by the camera, are reduced. Phase errors in the video color signals produced by the apparatus are thereby substantially reduced and display images of improved quality can thus be obtained by such an apparatus.

What is claimed is:

1. In a single-tube color video camera apparatus including a camera tube having a photo-electric conversion section and scanning means for scanning said conversion section with an electron beam, a color separation stripe filter disposed in a light path leading to said photo-electric conversion section whereby said camera tube produces an output signal including a color multiplex carrier signal which is phase modulated in accordance with respective positions of color stripes of said filter and the scanning speed of said electron beam, and means for extracting said color multiplex carrier signal from said output signal, the improvement comprising:

means for performing envelope detection of said camera tube output signal to produce an envelope detection signal and means for executing phase compensation of said color multiplex carrier signal as a function of said envelope detection signal, after extraction of said color multiplex carrier signal from said camera tube output signal.

2. A camera apparatus according to claim 1, in which said phase compensation means performs phase adjustment of said color multiplex carrier signal in proportion to the amplitude of said envelope detection signal.

3. A color video camera apparatus according to claim 1, in which said phase compensation means comprises a variable delay circuit for applying an amount of delay to said color multiplex carrier signal which is determined in accordance with said envelope detection signal.

4. A color video camera apparatus according to claim 1, and further comprising a modulation factor compensation circuit coupled to receive said camera tube output signal for executing compensation of a frequency characteristic of said output signal in accordance with modulation factor frequency characteristic of said camera tube, and wherein a compensated signal thereby produced from said modulation factor compensation circuit is supplied to said envelope detection means for deriving said envelope detection signal.

5. In a single-tube color video camera apparatus including a camera tube having a photo-electric conversion section and scanning means for scanning said conversion section with an electron beam, a color separation stripe filter disposed in a light path leading to said photo-electric conversion section whereby said camera tube produces an output signal including a color multiplex carrier signal which is phase modulated in accordance with respective positions of color stripes of said filter and the scanning speed of said electron beam, means for performing envelope detection of said camera tube output signal to produce an envelope detection signal, and means for extracting said color multiplex carrier signal from said output signal, the improvement comprising:

circuit means for executing control, as a function of said envelope detection signal, of a horizontal deflection signal which controls the speed of electron beam scanning by said camera tube, for thereby performing phase compensation of said color multiplex carrier signal in accordance with said envelope detection signal.

6. In a single-tube color video camera apparatus including a camera tube having a photo-electric conversion section and scanning means for scanning said conversion section with an electron beam, a color separation stripe filter disposed in a light path leading to said photo-electric conversion section whereby said camera tube produces an output signal including a color multiplex carrier signal which is phase modulated in accordance with respective positions of color stripes of said filter and the scanning speed of said electron beam, means for extracting said color multiplex carrier signal from said output signal, memory means operable for storing data derived from said color multiplex carrier signal during at least one frame interval of said camera tube output signal under a condition of light of a predetermined color alone being imaged by said camera tube and for subsequently producing a data signal based upon said stored data, means for employing one of a first and a second signal as a reference signal, where said first signal is said data signal and said second signal is said color multiplex carrier signal, to execute control whereby time axis deviations of the other one of said first and second signals are made coincident with time axis deviations of said reference signal, means for deriving a plurality of standard signals based on said data signal, and means for performing synchronous demodulation of said color multiplex carrier signal by utilizing said standard signals, wherein the improvement comprises:

means for performing envelope detection of said camera tube output signal to produce an envelope detection signal; and means for executing phase compensation of said color multiplex carrier signal as a function of said envelope detection signal, after extraction of said color multiplex carrier signal from said camera tube output signal, and for transmitting a resultant phase-compensated color multiplex carrier signal to be demodulated by said synchronous demodulation means.

7. A color video camera apparatus according to claim 6 in which said phase compensation means comprises a variable delay circuit for applying an amount of delay to said color multiplex carrier signal which is determined in accordance with said envelope detection signal.

8. A color video camera apparatus according to claim 7, and further comprising a modulation factor compensation circuit coupled to receive said camera tube output signal for executing compensation of a frequency characteristic of said camera tube output signal in accordance with a modulation factor frequency characteristic of said camera tube, and wherein a compensated signal thereby produced from said modulation factor compensation circuit is supplied to said envelope detection means for deriving said envelope detection signal.

* * * * *